UNITED STATES PATENT OFFICE 2,474,838

PREPARATION OF BETA-ISOTHIOUREA PROPIONIC ACIDS

Thomas L. Gresham and Forrest W. Shaver, Akron, Ohio, assignors to The B. F. Goodrich Company, New York, N. Y., a corporation of New York No Drawing. Application October 5, 1945, Serial No. 620,661

2 Claims. (Cl. 260—534)

This invention relates to the preparation of nitrogen- and sulfur-containing beta-substituted carboxylic acids, particularly propionic acids, and is especially concerned with the preparation of such compounds by the reaction of beta-lactones with certain nitrogen- and sulfur-containing compounds such as the thioureas.

It is disclosed in U. S. Patent 2,356,459 to Frederick E. Küng that beta-lactones, that is lactones or inner esters of beta-hydroxy carboxylic acids may be obtained in good yields by the reaction of a ketene with an aldehyde or ketone. In this manner beta-propiolactone (also called hydracrylic acid lactone) which has the structure

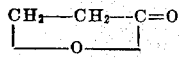

is economically obtained from ketene and formaldehyde.

We have now discovered that beta-propiolactone, and also the other beta-lactones, will react with nitrogen and sulfur containing organic compounds having a nitrogen atom and a sulfur atom satisfying three valences of the same carbon atom and having at least one hydrogen atom attached to at least one of the said nitrogen and sulfur atoms, to produce in high yields beta-substituted carboxylic acids in which a thio linkage, —S—, is attached on the one hand to a carbon atom in turn attached by a double bond to a nitrogen atom and on the other hand to a carbon atom in beta position to a carboxyl group.

The nitrogen and sulfur containing compound may be, in accordance with the above definition, one containing the characteristic structure

or it may be a tautomeric form of such a compound having the characteristic structure

In either event the compound reacts in the latter tautomeric form with the beta-lactone in accordance with the following equation:

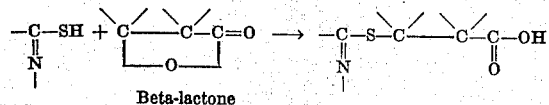

Sulfur and nitrogen containing compound    Beta-lactone    Beta-substituted carboxylic acid the disconnected valences being attached to hydrogen atoms, or to any of the other groupings capable of covalently linking to carbon or nitrogen as the case may be.

No special conditions for the reaction are necessary, the reaction proceeding whenever it is possible to bring the reactants into effective contact with one another. This is ordinarily accomplished by the use of a solvent for the reactants, polar solvents being preferred. Since many of the nitrogen and sulfur-containing compounds and many beta-lactones are soluble in water, the use of water as the solvent for the reactants is an especially preferred procedure. In this event the beta-substituted product, being generally insoluble in water, is precipitated during the reaction and is thus readily separated from the reaction medium. Other polar solvents which dissolve the reactants such as alcohols, organic acids, organic nitriles, and the like, however, may also be used. The temperature at which the reaction is effected is not critical but is preferably from 0 to 100° C., more preferably from 0 to 50° C. Proportions of reactants may be varied widely using an excess of either of the reactants if desired, but in general the use of substantially equimolecular proportions of the reactants is preferred.

Thiourea is a preferred nitrogen and sulfur containing compound of the type hereinabove set forth and beta-propiolactone is the preferred beta-lactone. Accordingly, the invention will be specifically illustrated by the following example of the reaction of these materials to produce beta-isothiourea propionic acid.

Example 1

An aqueous solution of thiourea is prepared by dissolving 76 parts by weight of thiourea in 300 parts by weight of water, heating to assist dissolution if necessary. The solution is then cooled to 20° C. and 72 parts by weight of beta-propiolactone are slowly added with constant stirring while the temperature of the solution is between about 20 and 30° C. During addition of the beta-lactone a precipitate separates from solution and after the addition the thick reaction product is stirred for about an hour. The precipitate is filtered and recrystallized from hot water whereupon crystals of a hydrate of beta-isothiourea propionic acid are obtained. When this hydrate is heated it loses water and a white powder consisting of beta-isothiourea propionic acid (which may also be called S-beta-carboxyethyl isothiourea) (M. P. 170–171° C.) is produced in quantitative yield. The product possesses the structure:

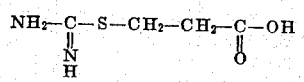

When the product obtained (beta-isothiourea propionic acid) is refluxed with sodium hydroxide and the solution then acidified, thiohydracrylic acid (beta-mercapto-propionic acid) is obtained in substantially quantitative yield. Hence the reaction of the above example may be utilized as a means of producing thiohydracrylic acid from beta-propiolactone.

Other water-soluble thiourea compounds (thiocarbamides) may be substituted for thiourea in the above example and similar beta-substituted propionic acids thereby secured. For example, methyl thiourea, N,N'-diethyl thiourea, phenyl thiourea, acetyl thiourea glycollyl thiourea (i. e., thiohydantoin), malonyl thiourea (i. e., thiobarbituric acid), thiohydantoic acid

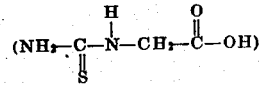

carbamyl thiourea (i. e. thiobiuret), guanylthiourea, thioallantoin, trithiocyanuric acid and other compounds of the general formula

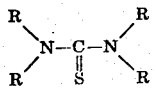

wherein at least one R represents hydrogen and the remainder represent organic radicals, which may or may not be connected to each other to form a cyclic structure, may all be reacted with beta-propiolactone in aqueous solution to form crystalline beta-substituted propionic acids. In addition, thioureas which are not appreciably soluble in water such as N,N'-diphenyl-thiourea (thiocarbanilide), N,N-diphenyl thiourea, sym-di-o-tolyl thiourea, benzyl thiourea and the like may also be reacted with the beta-lactone by employing ethyl alcohol or some other solvent for the reactants in place of water.

It is also within the scope of this invention to react numerous other sulfur and nitrogen containing organic compounds, preferably water-soluble compounds, which possess one of the structures

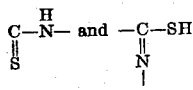

with beta-lactones, and thereby to obtain other beta-substituted carboxylic acids. Thus, thioacetamide and thiobenzamide and their homologs and N-substituted derivatives have only one hydrogen replaced such as thio-acetanilide, and other compounds of the formula

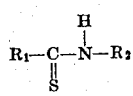

where $R_1$ is an organic radical having its connecting valence on a carbon atom and $R_2$ is hydrogen or such an organic radical, including thio oxamic acid,

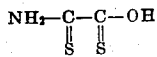

and its esters, and the like may be reacted with beta-lactones to produce beta-substituted carboxylic acids. Other nitrogen and sulfur compounds of the type described include thio-carbazides, thiosemicarbazides and thiuram sulfides and disulfides of the formula

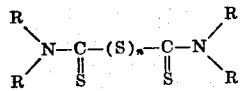

where at least one R is hydrogen and the remainder are organic radicals, and $n$ is 1 or 2. Tautomeric forms of any of the above-mentioned compounds, which differ only in that the

structure is changed to the

structure may also be used.

Since ammonium dithiocarbamate and similar compounds also contain the

structure, their reaction with beta-lactones is also included in the broad scope of this invention, but is more specifically disclosed and claimed in the copending application of Thomas L. Gresham and Jacob Eden Jansen, Ser. No. 620,663, filed October 5, 1945. Similarly, the reaction of beta-lactones with certain nitrogen containing heterocyclic mercaptans such as the 2-mercaptothiazoles and 2-mercaptothiazolines, which contain the

structure, is included within the broad scope of this invention but is more specifically disclosed and claimed in the copending application of Jacob Eden Jansen and Roger A. Mathes, Ser. No. 620,662, filed October 5, 1945.

Although beta-propiolactone, the simplest possible beta-lactone, is the preferred beta-lactone for use in this invention because of its low cost, its solubility in water and the ease with which the reaction is carried out, the homologs of beta-propiolactone, that is, other saturated aliphatic beta-lactones such as beta-butyrolactone, beta-isobutyrolactone, beta-valerolactone, beta-isovalerolactone, beta-n-caprolactone, alpha-ethyl-beta-propiolactone, alpha-isopropyl-beta-propiolactone, alpha-butyl-beta-propiolactone, alpha-isopropyl-beta-propiolactone, alpha-butyl-beta-propiolactone, alpha-methyl-beta-butyrolactone, alpha-ethyl-beta-butyrolactone, beta-methyl-beta-valerolactone and the like may also be used, as may other beta-lactones, to produce beta substituted carboxylic acid compounds. Other known beta-lactones include lactones of beta-hydroxy-mono-carboxylic acids containing cycloalkyl, aryl and aralkyl substituents such as beta-cyclohexyl-beta-propiolactone, beta-phenyl-beta-propiolactone, alpha-phenyl-beta-propiolactone, beta-benzyl-beta-propiolactone and the like, all of which, like beta-propiolactone and its homologs, are of the general structure

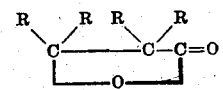

wherein R is hydrogen or an unreactive hydrocarbon group (i. e., a hydrocarbon group free from aliphatic unsaturation) and may be prepared in the manner described in the above-mentioned Küng patent. Still other known beta-lactones include lactones of unsaturated beta-hydroxy carboxylic acids, mono-beta lactones of dicarboxylic acids and dilactones of dicarboxylic acids in which at least one of the lactones is beta, examples of which are alpha, alpha-dimethyl-beta-propiolactone-beta-carboxylic acid; trimethyl-beta-propiolactone-beta-carboxylic acid; beta, beta-dimethyl-beta-propiolactone - alpha-carboxylic acid; trimethyl-beta-propiolactone-alpha-carboxylic acid and the beta-delta-dilactone of citrylidene malonic acid, all of which like the beta-lactones before mentioned are composed exclusively of hydrogen, carbon and carbonoxy

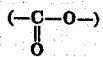

oxygen atoms. In addition to these compounds other compounds containing the structure

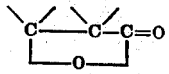

but having the valences on the alpha and beta carbons attached to groups containing elements other than or in addition to carbon and hydrogen such as oxygen, nitrogen, sulfur and halogen, whether in essentially unreactive structure such as nitro groups and ether linkages or in radicals containing reactive hydrogen such as amino and hydroxy, are also beta-lactones and hence are included within the generic class of beta-lactones. Examples of such latter compounds are alpha or beta-nitrophenyl-beta-propiolactone; beta (O-nitro-m-chlorophenyl)-beta-propiolactone; beta-(O-nitro-m-methoxyphenyl)-beta-propiolactone; alpha - hydroxy - beta-phenyl-beta-propiolactone and alpha - bromo - beta, beta - dimethyl-beta-propiolactone-alpha-carboxylic acid.

Thus, any of the generic class of beta-lactones may be used in the practice of this invention. When the reaction is carried out in aqueous solution, as in preferred, beta-lactones which are soluble in water (those beta-lactones containing no more than about six carbon atoms possess this property) are of course used.

The nitrogen and sulfur containing beta-substituted carboxylic acid compounds obtained by the reaction described are generally solid organic compounds which are useful as intermediates in the preparation of other compounds and for various other purposes. As mentioned above, they may be hydrolyzed to yield beta-mercapto carboxylic acids. In many instances they may be cyclicized to produce heterocyclic nitrogen and sulfur containing compounds.

Numerous other modifications and variations in the method of effecting the reaction and in the materials therein used will be obvious to those skilled in the art and are within the spirit and scope of the invention as defined in the appended claims.

We claim:
1. The method of preparing beta-isothiourea propionic acid which comprises reacting in aqueous solution beta-propiolactone and thiourea.
2. The method which comprises reacting a saturated aliphatic beta-lactone with thiourea and recovering the beta-isothiourea saturated aliphatic monocarboxylic acid thus formed.

THOMAS L. GRESHAM.
FORREST W. SHAVER.

REFERENCES CITED

The following references are of record in the file of this patent:

FOREIGN PATENTS

| Number | Country | Date |
|---|---|---|
| 845,793 | France | Sept. 1, 1939 |

OTHER REFERENCES

Johansson, Berichte (Deutsch. Chem. Gesell.), vol. 48, pp. 1262–1266, 1915.

Johansson, Chem. Zentrallblatt, vol. 1916 II, pp. 557, 558.

Andreasch, Beilstein (Handbuch der Org. Chem., 4th ed.), vol. 3, pages 299–300 (1921).

Barger et al., Bennett et al., Beilstein (2nd suppl. Handbuch der Org. Chem., 4th ed.), vol. 3, page 214 (1942).